United States Patent
Haran et al.

[11] Patent Number: 6,125,216
[45] Date of Patent: Sep. 26, 2000

[54] STRAIN ISOLATED OPTICAL FIBRE BRAGG GRATING SENSOR

[75] Inventors: Francis M. Haran, Argyll & Bute; Peter D. Foote, Bristol, both of United Kingdom

[73] Assignee: British Aerospace Public Limited Company, Farnborough, United Kingdom

[21] Appl. No.: 09/100,228

[22] Filed: Jun. 19, 1998

[30] Foreign Application Priority Data

Jun. 19, 1997 [GB] United Kingdom .................. 9712794

[51] Int. Cl.[7] .............................. G02B 6/00; G02B 6/34; G01J 1/04; G01L 1/24
[52] U.S. Cl. ...................... 385/12; 385/37; 250/227.14; 250/227.27; 356/35.5; 356/345; 73/800; 73/770
[58] Field of Search .................................. 385/37, 12, 13; 250/227.14, 227.15, 227.16, 227.17, 227.18, 227.23, 227.27; 356/35.5, 345; 73/800, 770

[56] References Cited

U.S. PATENT DOCUMENTS

| | | | |
|---|---|---|---|
| 5,361,130 | 11/1994 | Kersey et al. | 356/345 |
| 5,394,488 | 2/1995 | Fernald et al. | 385/13 |
| 5,461,926 | 10/1995 | Bobb et al. | 73/800 |

FOREIGN PATENT DOCUMENTS

| | | |
|---|---|---|
| 2 268 581 | 1/1994 | United Kingdom . |
| 2 299 203 | 9/1996 | United Kingdom . |

*Primary Examiner*—Cassandra Spyrou
*Assistant Examiner*—Fayez Assaf
*Attorney, Agent, or Firm*—Kenyon & Kenyon

[57] ABSTRACT

A strain isolated optical fibre Bragg grating sensor (1) has an optical fibre (2) provided at or adjacent one end (2a) with the Bragg grating (3). An open mouth cap (4) surrounds the fibre end (2a) and region provided with the Bragg grating (3) at a spacing from the fibre, fibre end and Bragg grating. The cap (4) is sealed to the fibre (2) at the open mouth at a side of the grating (3) remote from the fibre end (2a). The cap (4) is made from a low Young's modulus material and is operable to isolate the grating (3) from strain.

7 Claims, 2 Drawing Sheets

STRAIN ISOLATED OPTICAL FIBRE BRAGG GRATING SENSOR

FIELD OF THE INVENTION

This invention relates to a strain isolated optical fibre Bragg grating sensor suitable particularly, but not exclusively, for compensating non-strain isolated Bragg gratings for the effect of temperature.

BACKGROUND OF THE INVENTION

Fibre optics sensors may be used for measuring many parameters such as temperature, strain, pressure, displacement, electric field, refractive index, rotation, position and vibration. However because of sensitivity to these parameters, a fibre optic sensor can often suffer from cross sensitivity so that if used for measuring one parameter it may well also be effected by one or more of the other parameters. Although some of the cross sensitivity can be designed out of such sensors, it has proved particularly difficult to eliminate strain-temperature cross sensitivity.

OBJECTS OF THE INVENTION

Thus one object of the present invention is to provide an optical fibre Bragg grating sensor which is strain isolated and which therefore can be used for compensating for temperature effects on a similar non-strain isolated optical fibre Bragg grating sensor.

This and other objects and advantages of the present invention will become more apparent from details disclosed in the following specification where preferred embodiments of the invention are described.

SUMMARY OF THE INVENTION

According to one aspect of the present invention there is provided a strain isolated optical fibre Bragg grating sensor having an optical fibre provided at or adjacent one end thereof with a Bragg grating and an open mouth cap surrounding the fibre end and region provided with the Bragg grating at a spacing from the fibre, fibre end and Bragg grating, which cap is sealed to the optical fibre at the open mouth at a side of the Bragg grating remote from the fibre end, is made from a low Young's modulus material, and is operable to isolate the Bragg grating from strain.

Preferably the cap is a thin walled capillary tube made of fused silica.

Alternatively the cap is made of an epoxy resin. Conveniently the sensor contains a gaseous medium in the cap around the fibre, which medium has a low Young's modulus.

Advantageously the gaseous medium is air.

According to a further aspect of the present invention there is provided an optical fibre Bragg grating sensor system attachable to or incorporatable in an object, including one or more optical fibre Bragg grating sensors for sensing strain in or on the object and one or more strain isolated optical fibre Bragg grating sensors according to the present invention, for measuring temperature in or on the object.

Preferably the system includes means for receiving a temperature output signal from the or each strain isolated optical fibre Bragg grating sensor, processing said temperature output signal and generating therefrom an output compensating for effect of temperature on the or each optical fibre Bragg grating sensor.

DESCRIPTION OF THE DRAWINGS

For a better understanding of the present invention, and to show how the same may be carried into effect, reference will now be made, by way of example, to the accompanying drawings, in which.

DESCRIPTION OF EMBODIMENTS OF THE INVENTION

Figure 1:
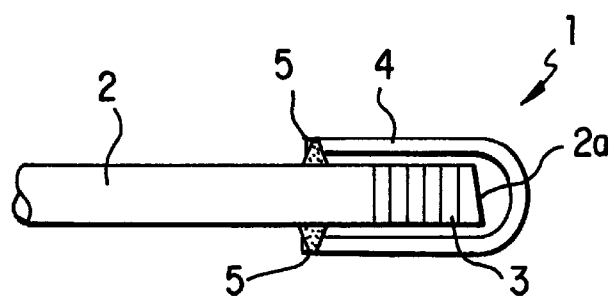
FIG. 1 is a diagrammatic view of a strain isolated optical fibre Bragg grating sensor according to the present invention.

A strain isolated optical fibre Bragg grating sensor according to the present invention is shown schematically at 1 in FIG. 1 of the accompanying drawings. The sensor 1 has an optical fibre 2 provided at or adjacent one end 2a thereof with a Bragg grating 3 which may be of equal spacing as shown or of variable spacing. An open mouth cap 4 surrounds the fibre end and region provided with the Bragg grating 3 at a spacing from the fibre, fibre end 2a and Bragg grating. The cap 4 is sealed to the optical fibre 2 at the open mouth at 5. The seal 5 lies at a side of the Bragg grating 3 remote from the fibre end 2a, is made from a low Young's modulus material and is operable to isolate the Bragg grating 3 from strain. The seal 5 may be a fusion splice or an epoxy resin.

The cap 4 is preferably a piece of thin walled fused silica capillary tube which surrounds the fibre end 2a and grating 3 without coming into physical contact with the grating 3. Alternatively the cap 4 may be made from epoxy resin. A suitable optical fibre 2 is a standard germania doped-mode optical fibre, for example with a diameter of 125 $\mu$m with the cap 4 being of 5 mm length with an internal diameter of substantially 150 $\mu$m and an external diameter of substantially 360 $\mu$m.

Conveniently the closed end of the cap 4 can be produced using a fusion splicer which can also be used for providing the seal 5 at the open mouth of the cap 4. The cap 4 effectively strain isolates the Bragg grating 3.

The sensor of FIG. 1 was attached to a bar of material which was strained using a three point bending test. Over a three point bend deflection of the bar over a range of 7.5 to 22.5 millimeters there was no strain reading from the sensor whereas a sensor not according to the Invention showed a strain change over this deflection range of between 500 to 1500 $\mu\epsilon$.

Figure 2:
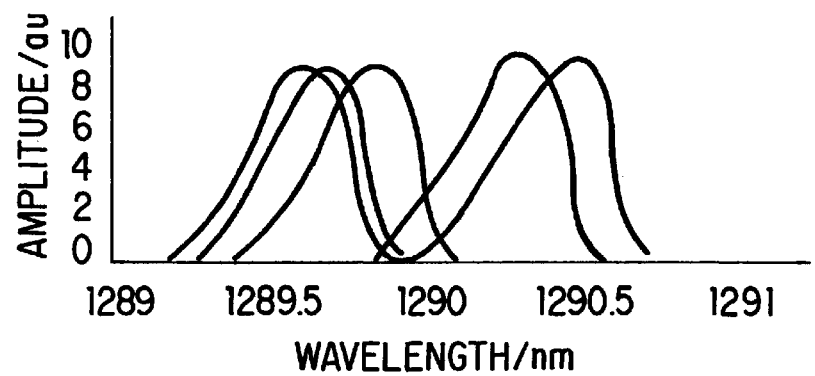
FIG. 2 is a graphical representation of amplitude versus wavelength showing how the wavelength peaks shift for constant strain with temperature for the sensor of FIG. 1.
Figure 3:
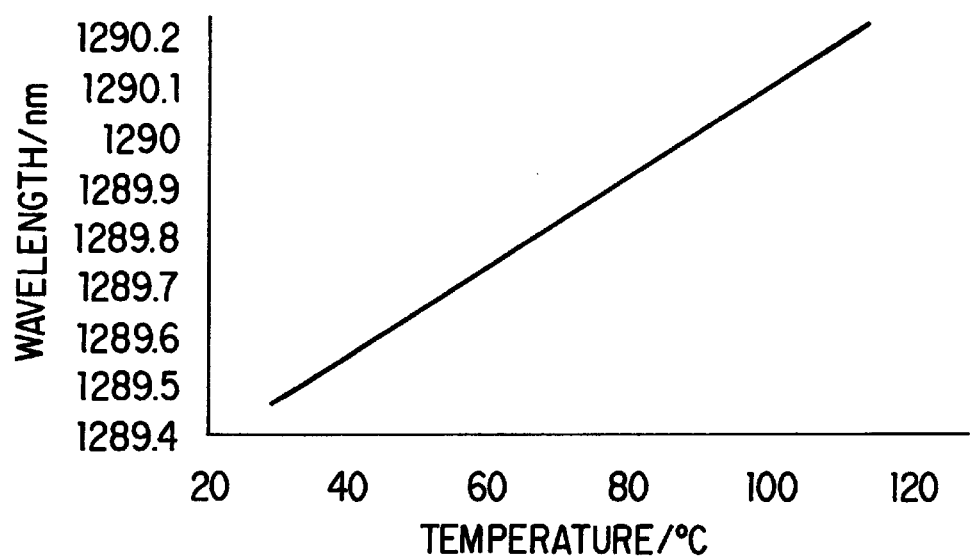
FIG. 3 shows the variation of wavelength peak positions with temperature for the sensor of FIG. 1.

FIG. 2 of the accompanying drawings shows how the reflection wavelength peak shifts with temperature when the sensor of FIG. 1 is heated. FIG. 3 plots the reflection wavelength peak positions at specific temperatures for the sensor of FIG. 1 when illuminated with a broadband superluminescent diode.

The cap 4 sealed to the optical fibre 2 at 5 in the strain isolated fibre optic Bragg grating sensor of FIG. 1 according to the present invention contains a gaseous medium around the fibre. This medium has a low Young's modulus which contributes to the strain isolating effect. Conveniently this gaseous medium is air.

Figure 4:
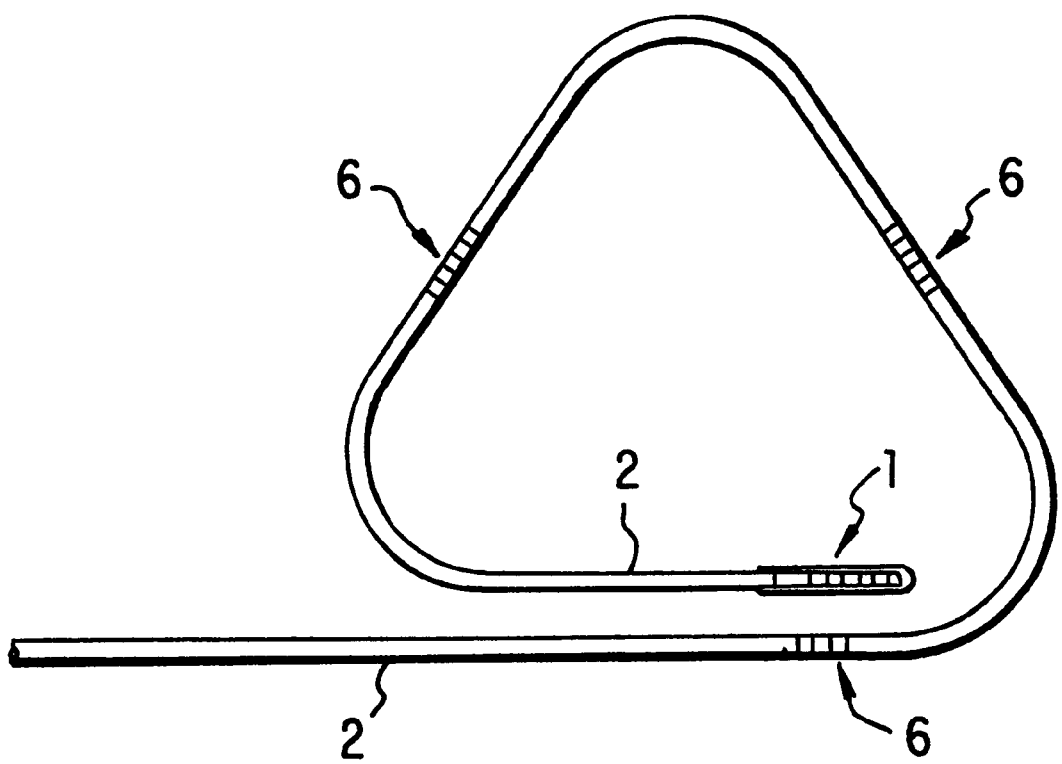
FIG. 4 is a diagrammatic plan view of an optical fibre Bragg grating sensor system including at least one strain isolated optical fibre Bragg grating sensor according to the present invention.

The strain isolated optical fibre Bragg grating sensor of the present invention is suitable for use in an optical fibre Bragg grating sensor system attachable to or incorporatable in an object on which strain is to be measured. Such a system is shown schematically in FIG. 4 of the accompanying drawings. This system includes one or more non strain-isolated optical fibre Bragg grating sensors 6 and at least one strain isolated sensor 1 according to the invention. The temperature measured by the strain isolated sensor 1 is used to compensate for the temperature cross-sensitivity of the remaining non-isolated sensors 6 in the system. Means are provided for receiving a temperature output signal from the or each strain isolated sensor 1, processing the signal and generating therefrom an output compensating for effect of temperature on the sensors 6. The sensors 6 using the same optical fibre 2 and Bragg grating 3 as the strain isolated sensor 1 are compatible therewith and hence the temperature reading from the sensor 1 is comparable directly to that experienced by the sensor 6. Of course the sensor 1 and sensors 6 are placed in close proximity to one another.

Various modifications and alterations may be made to the embodiments of the present invention described and illustrated, within the scope of the present invention as defined in the following claims.

What is claimed is:

1. A strain isolated optical fibre Bragg grating sensor having an optical fibre provided at or adjacent one end thereof with a Bragg grating, and an open mouth cap surrounding the fibre end and region provided with the Bragg grating at a spacing from the fibre, fibre end and Bragg grating, which cap is sealed to the optical fibre at the open mouth at a side of the Bragg grating remote from the fibre end, is made from a low Young's modulus material, and is operable to isolate the Bragg grating from strain.

2. A sensor according to claim 1, wherein the cap is a thin walled capillary tube made of fused silica.

3. A sensor according to claim 1, wherein the cap is made of an epoxy resin.

4. A sensor according to claim 1, containing a gaseous medium in the cap around the fibre, which medium has a low Young's modulus.

5. A sensor according to claim 4, wherein the gaseous medium is air.

6. An optical fibre Bragg grating sensor system attachable to or incorporatable in an object, including one or more optical fibre Bragg grating sensors for sensing strain in or on the object and one or more strain isolated optical fibre Bragg grating sensors according to claim 1, for measuring temperature in or on the object.

7. A sensor system according to claim 6, including means for receiving a temperature output signal from the or each strain isolated optical fibre Bragg grating sensor, processing said temperature output signal and generating therefrom an output compensating for effect of temperature on the or each optical fibre Bragg grating sensor.

* * * * *

UNITED STATES PATENT AND TRADEMARK OFFICE
CERTIFICATE OF CORRECTION

PATENT NO. : 6,125,216
DATED : September 26, 2000
INVENTOR(S) : Francis M. Haran, et. al.

It is certified that error appears in the above-identified patent and that said Letters Patent is hereby corrected as shown below:

In the Title Page: [54] Change "FIBRE" to --FIBER--.

[75] Change "Bristol" to --Helensburgh--.

| Column | Line | |
|---|---|---|
| 1 | 1 | Change "FIBRE" to --FIBER--. |
| 1 | 11 | Change "Fibre" to --Fiber--. |
| 1 | 17 | Change "effected" to --affected--. |
| 1 | 46 | After "Alternatively" insert --,--. |
| 1 | 67 | Change "into effect" to --out--. |
| 1 | 15,24,27 | Change "fibre" to --fiber--. |
| 1 | 35,36,38 | Change "fibre" to --fiber--. |
| 1 | 39 | Change "fibre" to --fiber-- (two occurrences). |
| 1 | 40,41,48, 51,53,55,60: | Change "fibre" to --fiber--. |
| 2 | 4,13,15,20, 23,26: | Change "fibre" to --fiber--. |
| 2 | 27 | Change "fibre" to --fiber-- (two occurrences). |
| 2 | 28,30,35,38 39,63,65 | Change "fibre" to --fiber--. |

UNITED STATES PATENT AND TRADEMARK OFFICE
CERTIFICATE OF CORRECTION

Page 2 of 2

PATENT NO. : 6,125,216
DATED : September 26, 2000
INVENTOR(S) : Francis M. Haran, et. al.

It is certified that error appears in the above-identified patent and that said Letters Patent is hereby corrected as shown below:

| Column | Line | |
|---|---|---|
| 3 | 1,2,7,16,26, 27,29 | Change "fibre" to --fiber--. |
| 4 | 1 | Change "fibre" to --fiber-- (two occurrences). |
| 4 | 2,4,11,16, 18,19,24,27 | Change "fibre" to --fiber--. |

In the Abstract: Lines 1,2,3,5 (two occurrences),6,7: Change "fibre" to --fiber--.

Signed and Sealed this

First Day of May, 2001

Attest:

NICHOLAS P. GODICI

*Attesting Officer*      *Acting Director of the United States Patent and Trademark Office*

UNITED STATES PATENT AND TRADEMARK OFFICE
CERTIFICATE OF CORRECTION

PATENT NO. : 6,125,216
DATED : September 26, 2000
INVENTOR(S) : Ashley C Humphrey It is certified that error appears in the above-identified patent and that said Letters Patent is hereby corrected as shown below:

Column 6, line 38, delete "or" and substitute -- on --.

Column 7, line 5, after "elevated", delete "is" and substitute -- as --.

Column 7, line 14, after "increase", delete "Ap" and substitute -- $\Delta p$ --.

Column 9, line 30, delete "thin" and substitute -- than --.

Claim 1, Column 10, line 26, delete "in" and substitute -- an --.

Claim 15, Column 12, line 4, delete "permit," and substitute -- permits --.

Signed and Sealed this

Fifteenth Day of May, 2001

*Attest:*

NICHOLAS P. GODICI

*Attesting Officer*        *Acting Director of the United States Patent and Trademark Office*